United States Patent [19]

Matsuzaki et al.

[11] Patent Number: 4,495,262

[45] Date of Patent: Jan. 22, 1985

[54] PHOTOSENSITIVE MEMBER FOR ELECTROPHOTOGRAPHY COMPRISES INORGANIC LAYERS

[75] Inventors: Masatoshi Matsuzaki, Hino; Toshinori Yamazaki, Hachioji; Isao Myokan, Hachioji; Tetsuo Shima, Hachioji; Hiroyuki Nomori, Hachioji, all of Japan

[73] Assignee: Konishiroku Photo Industry Co., Ltd., Tokyo, Japan

[21] Appl. No.: 489,317

[22] Filed: Apr. 28, 1983

[30] Foreign Application Priority Data

May 6, 1982 [JP] Japan .................................. 57-75655

[51] Int. Cl.³ ......................... G03G 5/082; B32B 7/12

[52] U.S. Cl. ........................................ 430/58; 430/84; 430/85; 430/95; 252/501.1; 357/30; 357/31

[58] Field of Search ....................... 430/84, 85, 95, 57, 430/58; 252/501.1; 357/30, 31

[56] References Cited

U.S. PATENT DOCUMENTS

| | | | |
|---|---|---|---|
| 4,289,822 | 9/1981 | Shimada et al. | 428/212 |
| 4,342,044 | 7/1982 | Ovshinsky et al. | 430/57 X |

*Primary Examiner*—John D. Welsh

*Attorney, Agent, or Firm*—Frishauf, Holtz, Goodman & Woodward

[57] ABSTRACT

Disclosed is a photosensitive member, or an electrophotographic photosensitive member, characterised by having a photoconductive layer comprising at least one of an amorphous hydrogenated and/or fluorinated silicon germanium and an amorphous hydrogenated and/or fluorinated silicon germanium carbide, a first amorphous hydrogenated and/or fluorinated silicon carbide layer formed on the photoconductive layer and a second amorphous hydrogenated and/or fluorinated silicon carbide layer formed beneath said photoconductive layer.

29 Claims, 6 Drawing Figures

PHOTOSENSITIVE MEMBER FOR ELECTROPHOTOGRAPHY COMPRISES INORGANIC LAYERS

This invention relates to a photosensitive member, more particularly to an electrophotographic photosensitive member.

Conventionally, as electrophotographic photosensitive members, there have been known photosensitive members made of Se or Se doped with As, Te, Sb, etc. or photosensitive members having ZnO or CdS dispersed in resin binders. However, these photosensitive members involve problems with respect to environmental pollution, thermal stability, mechanical strength, etc.

On the other hand, an electrophotographic photosensitive member employing amorphous silicon (a-Si) as matrix has recently been proposed. The a-Si has so-called dangling bonds formed by cleavage of Si-Si bondings, and there exist a large number of localized levels in the energy gap caused by such failures. For this reason, hopping conductance of thermally excited carriers occurs making dark resistance smaller, and optically excited carriers are trapped at the localized levels to thereby reduce photoconductivity. Accordingly, it has been practiced to fill up the dangling bonds by compensating the above failures with hydrogen atoms (H) to have H bonded to Si. Such an amorphous hydrogenated silicon (hereinafter called as a-Si:H) has been noted in various aspects such as good photosensitivity as well as reducing pollution good printing resistance, etc. However, a-Si:H is also known to be poorer in sensitivity to light of wavelengths from 750 to 800 nm by about one order in magnitude than to the light in the visible region. Accordingly, when a semiconductor laser is used as the recording light source in an information terminal processing machine for processing information signals electrically to be output as hard copy, the a-Si-H is insufficient in sensitivity and unsuitable for such information recording, since the practical semiconductor laser for information recording employing GaAlAs as constituent material has oscillated wavelengths of 760 to 820 nm. In case of a Se type photosensitive member, although it has a greater sensitivity as compared with a photosensitive member comprising an organic photoconductive material, it is also insufficient in sensitivity in the longer wavelength region to cope with increased processing speed.

Now, one may think of use of an amorphous hydrogenated silicon germanium (a-SiGe:H) as the photoconductive member for the purpose of improving sensitivity in the longer wavelength region while maintaining excellent photoconductivity or photosensitivity of a-Si:H. That is, a-SeGe:H has good photosensitivity in the wavelength region of 600 to 850 nm. However, a-SiGe:H layer alone has a dark resistance only of $10^8$ to $10^9$ Ω-cm, and it is also poor in charge retentivity. Moreover, because a-SiGe:H is poor in film attachment or adhesion to a support (substrate) and inferior in mechanical and thermal properties to a-Si:H, difficulties are encountered in practical application of a-SiGe:H as an electrophotographic photosensitive member.

The present inventor has made various investigations and consequently found a practically useful photosensitive member which is excellent in photosensitivity in relatively longer wavelength region and good in charge retaining characteristic and printing resistance, thus exhibiting characteristic and printing resistance, thus exhibiting stable charge retaining characteristic, to accomplish this invention.

The photosensitive member according to this invention is characterized by having a photoconductive layer comprising at least one of an amorphous hydrogenated and/or fluorinated silicon germanium (e.g. a-SiGe:H) and an amorphous hydrogenated and/or fluorinated silicon germanium carbide (e.g. a-SiGeC:H), a first amorphous hydrogenated and/or fluorinated silicon carbide (e.g. a-SiC:H) layer formed on the photoconductive layer and a second amorphous hydrogenated and/or fluorinated silicon carbide (e.g. a-SiC:H) layer formed beneath (or, beneath and contiguous to) said photoconductive layer.

According to this invention, while maintaining the high sensitivity characteristic in a relatively longer wavelength region (e.g. 600 to 850 nm) possessed by, for example, a-SiGe:H or a-SiGeC:H, stable charge retentivity and mechanical strength such as printing resistance are owned particularly by the first a-SiC:H layer, and high charge retentivity and film attachment realized particularly by the second a-SiC:H layer. Thus, there can be provided a useful photosensitive member which satisfies all the characteristics sufficiently, as compared with those known in the art. For exhibiting such a marked effect, it has been found to be critically important to choose the thickness of the above first a-SiC:H layer within the range from 50 to 5000 Å.

The photosensitive member according to this invention will be described below in detail with reference to the accompanying drawings.

Figure 1:
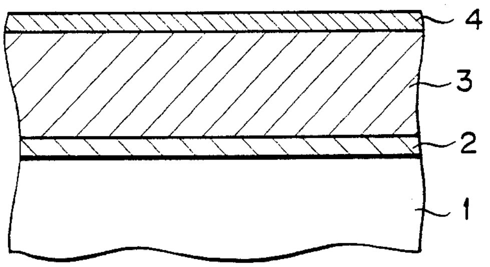
FIG. 1 and FIG. 2 are sectional partial views of each of two embodiments of the electrophotographic photosensitive member.
Figure 2:
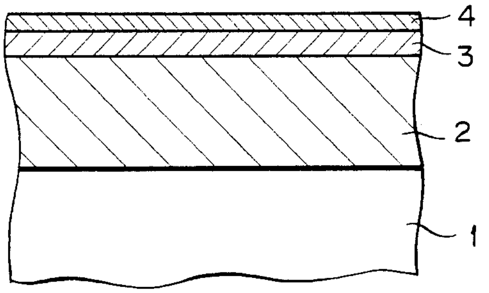

The photosensitive member according to this invention, as shown in, for example, FIG. 1 or FIG. 2, comprises the above second a-SiC:H layer 2, the above a-SiGe:H (photoconductive) layer 3 and the above first a-SiC:H layer 4 successively laminated on the electroconductive supporting substrate 1. The second a- SiC:H layer has the respective functions of charge retention, charge transport, prevention of charge injection from the substrate 1, and improvement in adhesion to the substrate, and it is preferred to be formed in a thickness of 50 Å to 5000 Å in the case of the embodiment of FIG. 1, or in a thickness of 5000 Å to 80 μm (more preferably 5 μm to 20 μm) in the case of the embodiment of FIG. 2. The photoconductive layer 3 generates carriers corresponding to light irradiation, exhibiting a high sensitivity in a longer wavelength region particularly of from 600 to 850 nm, and may preferably have a thickness of 5000 Å to 80 μm in the case of the embodiment of FIG. 1 or a thickness of 1000 Å to 5 μm (particularly 1 μm to 2 μm) in the case of the embodiment of FIG. 2. Further, the first a-SiC:H layer 4 has functions such as improvement of the surface potential characteristic of this photosensitive member, retention of potential characteristic over a long term, maintenance of environmental resistances (prevention of influences from humidity or atmosphere, chemical species formed by corona discharge), improvement of mechanical strength and printing resistance by enhanced surface hardness through improvement of bonding energy by inclusion of carbon, improvement of heat resistance during usage of the photosensitive member and improvement of heat transfer property (particularly, tack transfer property), thus working so to speak as a surface modifying layer. And, it is critically important to choose the thickness t of the first a-SiC:H layer 4 within the range as mentioned above, namely, $50Å \leqq t \leqq 5000Å$.

By constituting the photosensitive member as described above, it is possible to provide a photosensitive member which has a peak of spectral sensitivity in a relatively longer wavelength region (particularly 600 to 850 nm) and is effective for recording by a semiconductor laser, etc. The photosensitive member also provides various improvements due to the presence of upper and lower a-SiC:H layers, namely improvements of charge retentivity, mechanical, thermal, chemical characteristics and printing resistance (primarily by the first a-SiC:H) and improvement of film attachment to the support (primarily by the second a-SiC:H). Particularly, in a structure of FIG. 1, since the a-SiGe:H layer 3 is made thicker than each a-SiC:H layer, the surface potential can be increased during charging. Also, in a structure of FIG. 2, since the second a-SiC:H layer 2 is made thicker than the a-SiGe:H layer 3 so that the a-SiGe:H layer 3 may have the function primarily of generating photocarriers, the second a-SiC:H has both the role of increasing the surface potential during charging and the role suppressing the dark decay. In the following, the respective layers of the photosensitive member according to this invention will be described in further detail.

First a-SiC:H layer

This a-SiC:H layer 4 is essentially required to make the a-Si type photosensitive member practically excellent by modification of the surface of the photosensitive member. It enables the basic actuations as in electrophotographic photosensitive member of charge retention on the surface and decay of the surface potential by light irradiation. Accordingly, the repeating characteristic of charging and light decay is very stable, and good potential characteristic can be reproduced even after being left to stand for a long term (for example, one month or longer). On the contrary, in case of a photosensitive member having an a-Si:H surface, it is susceptible to influences from humidity, atmosphere, ozone atmosphere, etc., whereby there occurs a marked change in potential characteristic with lapse of time. Also, a-SiC:H has a high surface hardness and is therefore excellent in friction resistance in the steps of development, transfer, cleaning, etc., with a printing resistance of some hundred thousand times. Further, it has also good heat resistance and therefore a process for imparting heat such as tack transfer, etc. may also be applicable.

For exhibiting all of such excellent characteristics, it is critical to choose the thickness of the a-SiC:H layer 4 within the above-specified range, namely $50Å \leqq t \leqq 5000$ Å. That is, with a thickness exceeding 5000 Å, the residual potential becomes to high and lowering of sensitivity also occurs, whereby good characteristics as the a-Si type photosensitive member may be sometimes lost. On the other hand, with a thickness less than 50 Å, the charges are not charged on the surface through the tunnel effect, whereby there occurs increase of dark decay or marked lowering of photosensitivity through the film thickness balance between the a-SiC:H layer 4 and the a-SiGe:H layer 3. Thus, it is very important for the a-SiC:H layer 4 to have the thickness of 5000 Å or less and 50 Å or more.

Figure 3:
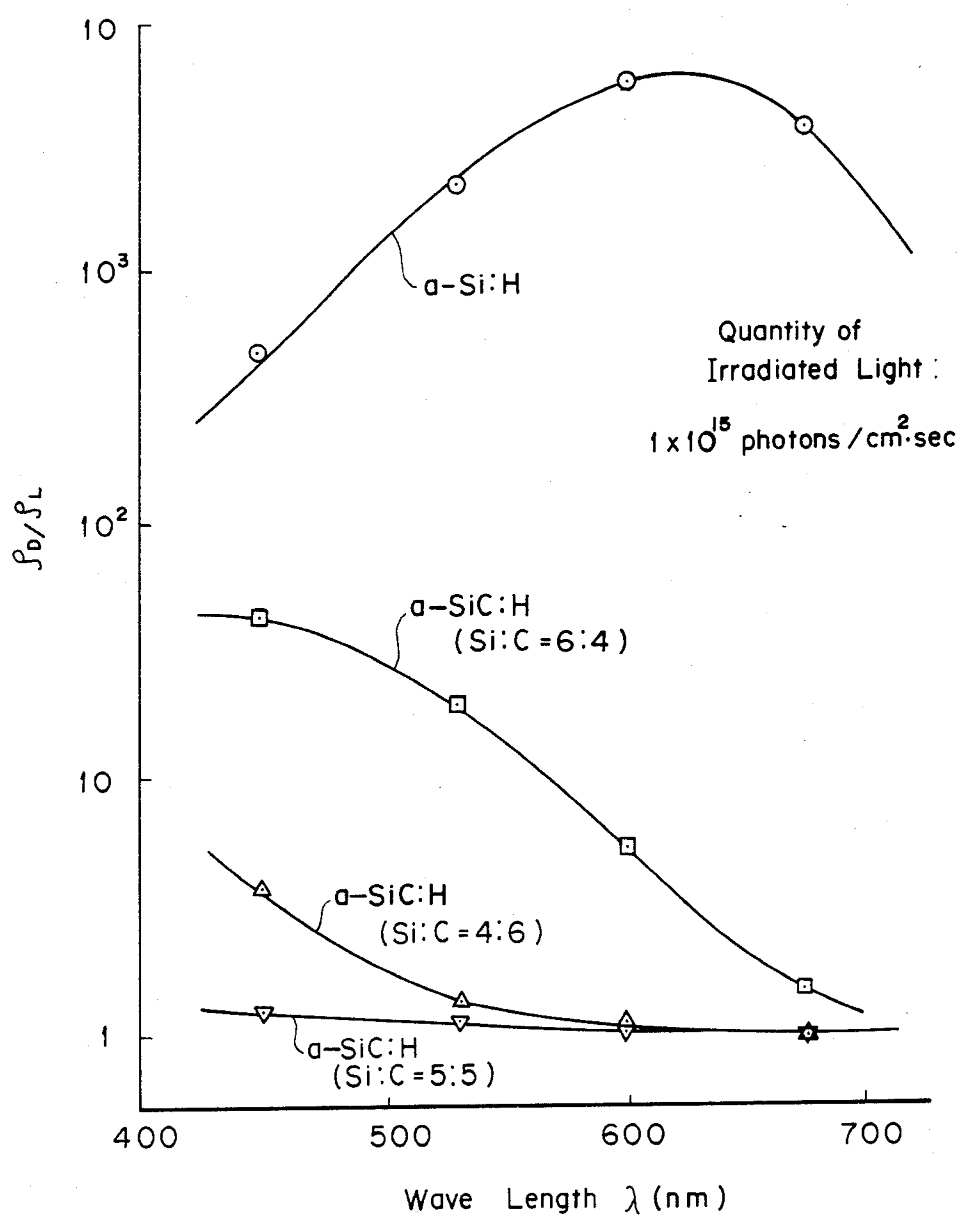
FIG. 3 is a graph showing photoconductivities of a-Si:H and a-SiC:H with various compositions.

Also, with regard to this first a-SiC:H layer 4, for exhibiting the above effects, it has also been found important to choose its carbon composition. When the composition ratio is represented in terms of a-$Si_{1-x}C_x$:H, x is desired to be 0.4 or more particularly $0.4 \leqq x \leqq 0.9$ (carbon atom content being 40 atomic % to 90 atomic %). When x is made 0.4 or more, the optical energy gap becomes approximately 2.3 eV or higher, whereby, as shown in FIG. 3, no substantial photoconductivity (provided that $\rho_D$ is the resistivity in a dark place, $\rho_L$ is the resistivity during light irradiation, photoconductivity being smaller as $\rho_D/\rho_L$ is smaller) is exhibited and through the so-called optically transparent window effect, most of the irradiated light reaches the a-SiGe:H layer (charge generating layer) 3. On the contrary, when x is less than 0.4, a part of the light is absorbed by the surface layer 4, whereby the photosensitive member is liable to be lowered in sensitivity. With a value of x in excess of 0.9, the layer is composed mostly of carbon loses or tends to lose the chracteristics as a semiconductor, and the deposition speed during formation of a-SiC:H film according to the glow discharge method is lowered. Therefore, it is preferred to make $x < 0.9$.

It is also essentially required in the first a-SiC:H layer similarly as in the second a-SiC:H layer to incorporate hydrogen. The content thereof should be generally in an amount of 1 to 40 atomic %, more preferably 10 to 30 atomic %.

Second a-SiC:H layer

This a-SiC:H layer 2 bears both functions of charge retention and charge transport, has a resistance to high electrical field, with a dark place resistivity being $10^{12}$ Ω-cm or more, has a large potential retained per unit film thickness, and moreover the electrons or holes injected from the photosensitive layer 3 exhibit great mobility and life time, whereby the carriers can be efficiently transported to the side of the support 1. Also, since the size of the energy gap can be controlled by the composition of carbon, the carriers generated corresponding to the light irradiation in the photosensitive layer 3 can be injected with good efficiency without forming a barrier thereagainst. The second a-SiC:H layer 2 also has the property of good adhesion or film attachment to the support 1, for example, an aluminum electrode. Accordingly, this a-SiC:H layer 2 retains a practically high level of surface potential and transports rapidly the carriers formed in the a-SiGe:H layer, thereby providing a photosensitive member which is high in sensitivity and free from residual potential.

For fulfilling such functions, the film thickness of the a-SiC:H layer is desired to be 5000 Å to 80 μm in the embodiment of FIG. 2 for the purpose of applying the dry system developing method according to, for example, Carlson system. When the film thickness is too thin as less than 5000 Å, no surface potential necessary for development cannot be obtained, while a thickness exceeding 80 μm will increase the surface potential so high that releasing property of the toner adhered is worsened and even the carrier of a binary component system developer is also adhered. However, a practical level of surface potential can be obtained even when the film thickness of the a-SiC:H layer may be made thinner (e.g. ten and some um) as compared with Se photosensitive members.

The a-SiC:H layer 2 in FIG. 1 is employed as a blocking and subbing layer and desired to have a film thickness of 50 Å. With a thickness less than 50 Å, insufficient charge retaining ability which is the problem in case of a-SiGe:H layer alone cannot be compensated and a thickness of at least 50 Å is necessary to compensate the charge retaining ability, and 50 Å or more thickness is desirable for the purpose of improvement of film attachment or adhesion to the substrate. On the other hand, with a thickness exceeding 5000 Å, good result can be obtained in aspect of charge retaining ability, but photosensitivity as a whole of the photosensitive member is worsened, and it will take a longer time for film fabrication of a-SiC:H which is a disadvantage from the standpoint of cost.

Also, when the a-SiC:H layer 2 is represented in terms of a-$Si_{1-x}C_x$:H, it is desirable to make $0.1 \leqq x \leqq 0.9$ (carbon atom content being 10 atomic % to 90 atomic %). By making $0.1 \leqq x$, the electrical and optical characteristics of the a-SiC:H layer can be made entirely different from those of the a-SiGe:H layer 3. When $x > 0.9$, most of the layer is composed of carbon loses its semiconductor characteristics, and deposition speed during film fabrication is also lowered. For prevention of these drawbacks, it is desirable to make $x \leqq 0.9$.

a-SiGe:H layer (photoconductive layer or photosensitive layer)

The a-SiGe:H layer 3 is known to exhibit a high photoconductivity to a light with a relatively long wavelength, and has a sufficient photosensitivity [reciprocal of half-value exposure dosage (erg/$cm^2$)].

The a-SiGe:H 3 may have a thickness, which is preferably 5000 Å to 80 μm in the case of the embodiment of FIG. 1, and 1000 Å to 5 μm in the case of the embodiment of FIG. 2. In FIG. 1, if the film thickness is less than 5000 Å, the surface potential and the surface charges necessary for developing are not readily obtained, and the light irradiated is not absorbed at all, but a part thereof reaches the underground of a-SiC:H 2, whereby photosensitivity is lowered. On the other hand, a thickness exceeding 80 μm will take a long time for film preparation which results in poor productivity. In the embodiment of FIG. 2, with a thickness less than 1000 Å, photosensitivity is also lowered and the upper limit is sufficiently 5μm, since the a-SiGe:H itself need not possess a charge retentivity and therefore no more thickness than is required for a photosensitive layer is necessary.

Also, particularly in the embodiment of FIG. 1, for the purpose of enhancing the charge retentivity of the a-SiGe:H layer 3, it is effective to enhance the resistance of a-SiGe:H by doping, for example, an element belonging to the group III A of the periodic table (B, A1, Ga, In, etc.) during film preparation thereof. The film characteristics of the a-SiGe:H layer will differ greatly depending on the film forming conditions such as the substrate temperature, high frequency discharging power, etc. in the preparation method as hereinafter described. From aspect of composition, Ge content may preferably be set at 0.1 to 50 atomic %. At a level less than 0.1 atomic %, sensitivity to longer wavelength is not improved so much, while a level is excess of 50 atomic % will result in lowering in sensitivity as well as deterioration of the mechanical characteristics or thermal characteristics. As for the bondings between Si and H in a-SiGe:H, Si—H bondings may be desirably more than

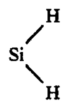

bondings. More specifically, the infrared absorption intensity $I\nu_{SiH2}$ at the wave number of about 2090 $cm^{-1}$ and the infrared absorption intensity $I\nu_{SiH}$ at the wave number of about 2000 $cm^{-1}$ may preferably satisfy the relation: $0 \leqq I\nu_{SiH2}/I\nu_{SiH} \leqq 0.3$. The amount of H bonded to Si may preferably 3.5 to 20 atomic % based on Si. When these conditions are satisfied, the photosensitive member obtained has desirably a great $\rho_D/\rho_L$.

For improvement of the film characteristics of the a-SiGe:H layer, carbon may be effectively incorporated to provide an a-SiCGe:H layer. That is, it is desirable to incorporate 0.001 ppm to 30 atomic % (particularly 0.01 ppm to 10000 ppm) of carbon. At a level lower than said range, there occurs lowering in strength, while on the contrary at a higher level in photosensitivity is lowered, particularly in a longer wavelength region. This is because the optical energy gap is enlarged by carbon (see the example of a-SiC:H in FIG. 3).

Alternatively, in the above description, for compensation of the dangling bonds, fluorine may be introduced into a-Si in place of or in combination with H to provide a-SiGe:F, a-SiGe:H:F, a-SiCGe:F, a-SiCGe:H:F, a-SiC:F, a-SiC:H:F or the like. In this case, the content of fluorine may be preferably 0.01 to 20 atomic %, more preferably 0.5 to 10 atomic %.

Figure 4:
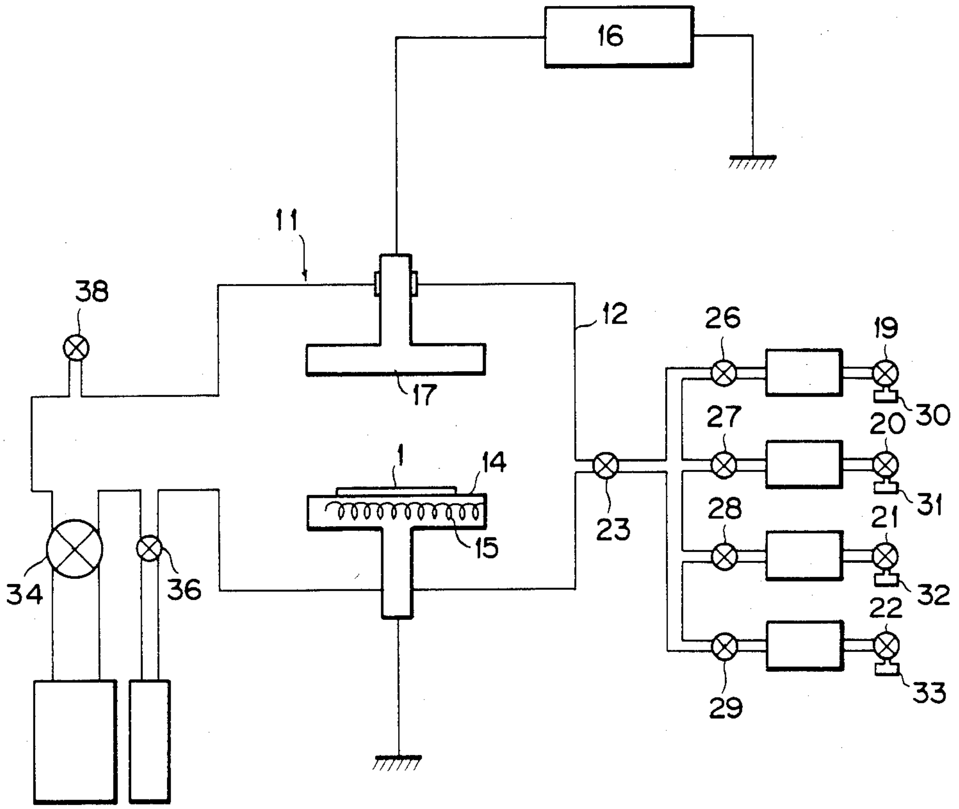
FIG. 4 is a schematic sectional view of a device for preparation of the above photosensitive member.

Referring now to FIG. 4, a device available for preparation of the photosensitive member according to this invention, for example, a glow discharge decomposition device be described.

In the vacuum chamber 12 of this device 11, the above-mentioned substrate 1 is fixed on a substrate holding section 14, and the substrate 1 can be heated to a desired temperature by means of a heater 15. Confronting the substrate 1, there is disposed a high frequency electrode 17 and glow discharge is excited between the electrode and the substrate 1. The numerals 19, 20, 21, 22, 23, 26, 27, 28, 29, 34, 36 and 38 show respective valves, 30 a source for supplying $GeH_4$ or a gaseous germanium compound, 31 a source for supplying $SiH_4$ or a gaseous silicon compound, 32 a source for supplying $CH_4$ or a gaseous carbon compound and 33 a source for supplying a carrier gas such as Ar or $H_2$. In this glow discharge device, in the first step, after cleaning of the surface of the support, for example, an A1 substrate 1, it is arranged in the vacuum chamber 12, which is then evacuated by controlling the valve 36 to a gas pressure in the vacuum chamber 12 of $10^{-6}$ Torr, and the substrate 1 is heated and maintained at a desired temperature, for example, 200° C. As the next step, using a high purity inert gas as the carrier gas, gas mixtures each comprising a dilution in appropriate quantity of $SiH_4$ or a gaseous silicon compound, $GeH_4$ or a gaseous germanium compound, and $CH_4$ or a gaseous carbon compound are introduced suitably corresponding to the respective film compositions, and a high frequency voltage is applied by a high frequency power source 16 under the reaction pressure of 0.01 to 10 Torr controlled by the valve 34. By this operation, the above respective gases are decomposed by glow discharging thereby to deposit a-SiC:H containing hydrogen as the above layer 2 (further the layer 4) on the substrate 1. During this operation, by controlling suitably the flow rate ratio of the silicon compound to the carbon compound and the substrate temperature, there can be precipitated an a-$Si_{1-x}C_x$:H (e.g. with a value of x up to 0.9) having desired composition ratio and optical energy gap, and it is also possible to deposit a-SiC:H at the rate of 1000 Å/min. or higher without giving any significant influence to the electrical characteristics of a-SiC:H precipitated. Further, for deposition of a-SiGe:H (the above photosensitive layer 3), a silicon compound and a germanium compound may be subjected to glow discharging decomposition without supplying a carbon compound. For formation of a-SiCGe:H, a carbon compound may be supplied at the same time. Particularly, by subjecting a mixture having added a gaseous compound of an element of the group III A of the periodic table such as $B_2H_6$ in an appropriate amount to a silicon compound or a germanium compound in the a-SiGe:H layer to glow discharging decomposition, a-SiGe:H can be improved in photoconductivity and also made higher in resistance.

The preparation method as described above is according to the glow discharge decomposition method, but other than this method, preparation of the above photosensitive member may be possible according to the sputtering method, ion-plating method or the method wherein a-SiC or a-SiGe is vapor deposited under introduction of hydrogen activated or ionized in a hydrogen discharging tube [particularly, the method disclosed in Japanese Unexamined Patent Publication No. 78413/1981 (Japanese Patent Application No. 152455/1979) by the present Applicant]. As the reactive gases to be employed, in addition to $SiH_4$, $GeH_4$, it is also possible to use $Si_2H_6$, $Ge_2H_6$, $SiF_4$, $SiHF_3$ or derivative gases thereof, lower hydrocarbon gases other than $CH_4$ such as $C_2H_6$, $C_3H_8$ and the like.

In the following, the specific examples in which the present invention is applied for electrophotographic photosensitive member will be described in detail.

EXAMPLE 1

An A1 substrate washed with trichloroethylene and subjected to etching with 0.1% aqueous NaOH solution, 0.1% aqueous $HNO_3$ solution was set in a glow discharge device, and a second a-SiC:H layer with a thickness of 10 μm, an a-SiGe:H layer with a thickness of 2 μm and a first a-SiC:H layer with a thickness of 1000 Å formed successively and continuously on the A1 substrate under the conditions shown below.

Formation of the second a-SiC:H layer:
$CH_4$ flow rate: 8 cc/min.
$SiH_4$ flow rate: 12 cc/min.
Ar gas flow rate: 100 ccmin.
Inner pressure in vacuum chamber during discharging: 0.2 Torr
Substrate temperature: 200° C.
Discharging power: 20 W
Film preparation time: ca 10 hours
Formation of a-SiGe:H layer:
$GeH_4$ flow rate: 4 cc/min.
$SiH_4$ flow rate: 16 cc/min.
Ar gas flow rate: 100 cc/min.
Inner pressure in vacuum chamber during discharging, discharging power and substrate temperature: Same as above.
Film preparation time: ca. 2 hours
Formation of the first a-SiC:H layer:
Film preparation time: ca. 6 minutes
Other conditions: Same as in the case of the second a-SiC:H layer For the thus prepared photosensitive member, the compositions of the respective layers were examined by Auger electron spectroscopy to find that both of the first and the second a-SiC:H layers consisted substantially of a-$Si_{0.6}C_{0.4}$:H and the a-SiGe:H layer substantially of a-$Si_{0.8}Ge_{0.2}$:H with its optical band gap being 1.5 eV. On this photosensitive member was applied corona charging at −6 KV for 10 seconds, followed by dark decay for 5 seconds, and then the member was irradiated with a light with a wavelength of 750 nm at an intensity of 1 $\mu W/cm^2$ for measurement of its charge decaying characteristic. The result is given in the Table shown below.

Figure 5:
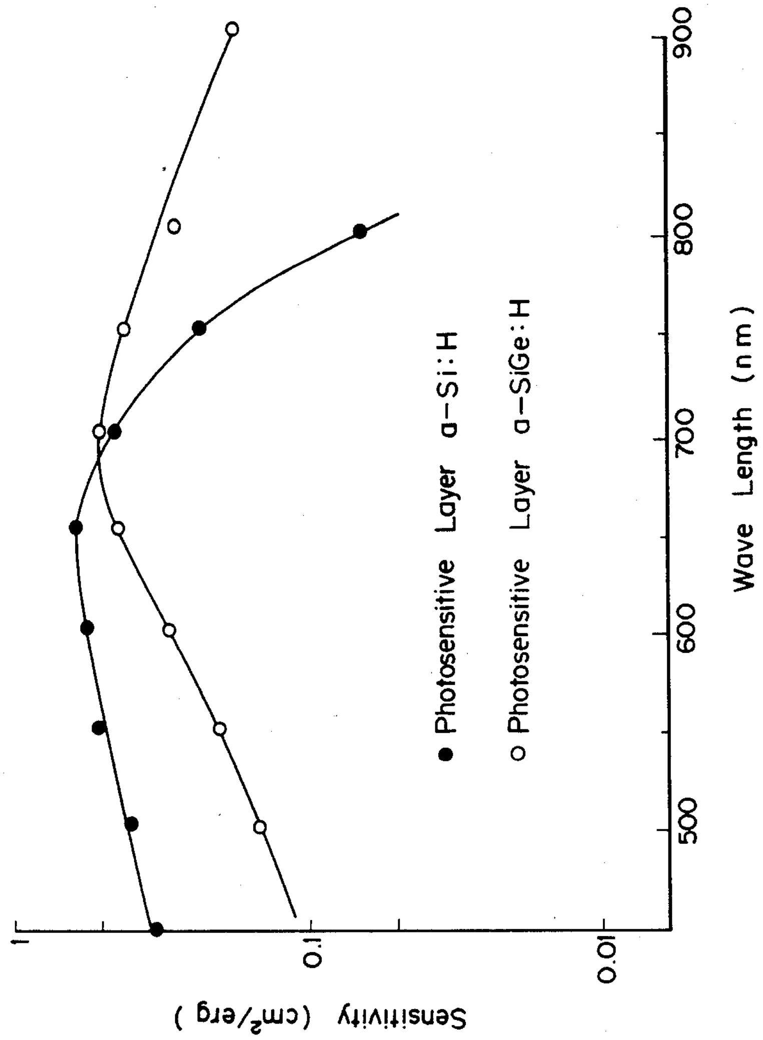
FIG. 5 is a graph showing photosensitivities of respective photosensitive members versus wavelengths of the light.

Then, this photosensitive member was subjected to an imagewise exposure at 10 $\mu W/cm^2$ with a wavelength of 750 nm to form an electrostatic image thereon, developed with a positively charged toner, and the developed image was transferred onto a transfer paper, followed by fixing, whereby there could be obtained a clear image with a high density and without fog. The spectral senstivity characteristic of this photosensitive member was shown in FIG. 5, which indicates that by use of the a-SiGe:H layer as the photosensitive layer, the photosensitivity [reciprocal of half-value exposure dosage ($erg/cm^2$)] on the longer wavelength side was better as compared with the case of a-Si:H to exhibit sufficient sensitivity to the light with a wavelength of 750 nm.

EXAMPLE 2

According to the same glow discharge method as in Example 1, there were successively laminated on an A1 substrate a second a-SiC:H layer with a thickness of 1500 Å, a boron doped a-SiGe:H layer with a thickness of 10 μm and a first a-SiC:H layer with a thickness of 1000 Å. But, during film preparation of the a-SiGe:H layer, glow discharging was effected by mixing with 1% Ar-diluted $B_2H_6$ at a flow rate ratio of $B_2H_6/SiH_4=0.01$ (%).

The resultant photosensitive member had a film composition which was substantially the same as in Example 1 (except that the a-SiGe:H layer contained boron). And, after the respective treatments of corona charging at −6 KV (10 seconds), dark decay (5 seconds), light irradiation at 1 $\mu W/cm^2$ with a wavelength of 750 nm, the charge decaying characteristic was measured to obtain the result as shown in the Table shown below.

After formation of an electrostatic latent image by application of an imagewise exposure on this photosensitive member at 10 $\mu W/cm^2$ with a wavelength of 750 nm, liquid development with a positively charged toner, transfer onto a transfer paper and fixation were conducted to obtain an image which was high in density and clear without fog.

EXAMPLE 3

According to the vapor deposition method as described in Japanese Unexamined Patent Publication No. 78413/1981 (inner pressure in the vacuum chamber before film preparation being $8.5\times10^{-7}$ Torr), a single crystalline SiC (vaporization source) was evaporated by heating with an electron beam, while an activated or ionized hydrogen was introduced into the vacuum chamber by charging 50 cc/min. of hydrogen into a hydrogen discharging tube connected to the vacuum chamber, thereby to form respective a-SiC:H layers on an aluminum substrate at a substrate temperature of 400° C. and a substrate voltage of −4 KV at a film forming rate of 20 Å/sec. Each a-SiC:H was found to have a composition of a-$Si_{0.6}C_{0.4}$:H, and the second a-SiC:H was made to have a thickness of 2000 Å, while the first a-SiC:H a thickness of 1000 Å. As the photosensitive layer, there was formed an A1-doped a-SiGe:H to a thickness of 10 um. That is, by using crystalline Si, Ge and A1 as the vaporization sources in the above method, and the respective contents in the film were controlled by controlling the vaporizing amounts of these components through current control of the electron beam. In this case, the hydrogen flow rate was made 50 cc/min., the substrate temperature 400° C., the substrate voltage −4 KV, and the film forming rate 10 Å/sec. The resultant A1-doped photosensitive layer had a composition consisting of a-$Si_{0.75}Ge_{0.25}$:H with an Al content of 100 ppm, as the result of Auger electron spectroscopic analysis.

Then, on this photosensitive member, there were applied a corona charging at +6 KV (5 seconds) and light irradiation at 1 $\mu W/cm^2$ with a wavelength of 750 nm, respectively, for examination of the charge decaying characteristic to obtain the result as shown in Table 1 below.

Also, after formation of an electrostatic image by applying on this photosensitive member an imagewise exposure at 10 $\mu W/cm^2$ with a wavelength of 750 nm, liquid development with a negatively charged toner, transfer onto a transfer paper and fixation were conducted, whereby there could be obtained a clear image with a high image density an without fog.

EXAMPLE 4

According to the glow discharge method of Example 1, on a stainless steel (SUS) substrate, there were successively laminated a second a-SiC:H layer with a thickness of 10 μm, an a-SiGe:H layer with a thickness of 2 μm and a first a-SiC:H layer with a thickness of 1500 Å. During film formation of the second a-SiC:H layer, there were employed the conditions of $CH_4$ flow rate of 12 cc/min., $SiH_4$ flow rate of 8 cc/min., Ar gas flow rate of 100 cc/min., substrate temperature of 250° C., discharging power of 20 W and film forming time of about 8 hours. The film forming conditions for the a-SiGe:H were the same as mentioned in Example 1. The first a-SiC:H layer was formed for about 6 minutes, under otherwise the same conditions as in preparation of the second a-SiC:H layer. Both of the first and the second a-SiC:H layers had the composition substantially of $Si_{0.4}C_{0.6}$:H, as the result of Auger electron spectroscopy.

On this photosensitive member were applied respectively the treatments of corona charging at −6 KV (10 seconds), dark decay (5 seconds), light irradiation at 1 $\mu W/cm^2$ with a wavelength of 750 nm (20 seconds) for measurement of the charge decaying characteristic to obtain the result as shown in Table 1 below.

Also, after formation of an electrostatic image by applying an imagewise exposure on this photosensitive member at 10 $\mu W/cm^2$ with a wavelength of 750 nm, development with a positively charged toner, transfer onto a transfer paper and fixation were conducted to obtain a clear image with a high density and without fog. When this operation was repeated to perform copying for 100,000 times, there was observed no deterioration in image quality.

The charge decaying characteristics of the respective photosensitive members obtained in the above Examples 1 to 4 were summarized in the following Table 1, which indicates that any of the members has satisfactory characteristics for electrography and is practically useful.

TABLE 1

| Example | Surface potential | Dark decay percent | Half-value exposure dosage | Residual potential | Remarks |
|---|---|---|---|---|---|
| 1 | −700 V | 28% | 2 erg/cm² | −3 V | Substantially no fatigue after 100,000 copying |
| 2 | −250 V | 32% | 2 erg/cm² | 0 V | — |
| 3 | +220 V | 30% | 3 erg/cm² | 0 V | — |
| 4 | −720 V | 28% | 2 erg/cm² | −5 V | Substantially no fatigue after 100,000 copying |

EXAMPLE 5

Using the method as described above, five kinds of samples were prepared by laminating successively on A1 substrates a second a-SiC:H layer with a thickness of 1 μm and further first a-SiC:H layers on these layers with various film thicknesses of 500 Å, 2000 Å, 5000 Å, 7500 Å and 1 μm.

Figure 6:
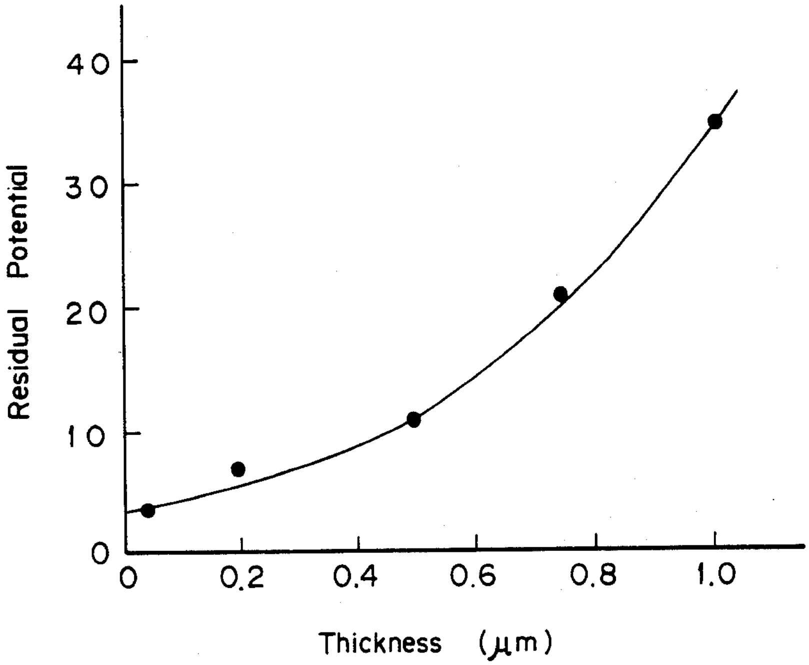
FIG. 6 is a graph showing variations of the residual potential depending on the thickness of the first a-SiC:H layer on the surface side.

For these photosensitive members, respective treatments of corona charing at +6 KV (10 seconds), dark decay (5 seconds), light irradiation at 1 $\mu W/cm^2$ with a wavelength of 750 nm (20 seconds) were conducted for measurement of the charge decaying characteristics of respective samples to obtain the results as shown in FIG. 6. From these data, it can be seen that the residual potential tends to be increased with the film thickness of the a-SiC:H layer and therefore the film thickness is desirably made 5000 Å or less. Generally speaking, a-Sic:H has a small absorption coefficient in the wavelength region of 600 nm or more and therefore causes no damage in photocarrier generation in the A-SiGe:H layer even with a large film thickness. So far as only this point is concerned, a-SiC:H layer may have a large thickness, but it is preferred to be 5000 Å or less when also taking the aspect of the above residual potential into consideration.

We claim:

1. A photosensitive member which comprises a substrate, a second silicon carbide layer on said substrate, a silicon germanium photoconductive layer on said second silicon carbide layer, and a first silicon carbide layer on said silicon germanium layer;

said first silicon carbide layer comprising amorphous hydrogenated silicon carbide or amorphous fluorinated silicon carbide or amorphous hydrogenated and fluorinated silicon carbide;

said second silicon carbide layer comprising amorphous hydrogenated silicon carbide or amorphous fluorinated silicon carbide or amorphous hydrogenated and fluorinated silicon carbide; and said silicon germanium photoconductive layer comprising at least one silicon germanium selected from the group consisting of amorphous hydrogenated silicon germanium, amorphous fluorinated silicon germanium, amorphous hydrogenated and fluorinated silicon germanium, amorphous hydrogenated silicon germanium carbide, amorphous fluorinated silicon germanium carbide and amorphous hydrogenated and fluorinated silicon germanium carbide.

2. The photosensitive member of claim 1, wherein said first silicon carbide layer has a thickness of from 50 Å to 5000 Å.

3. The photosensitive member of claim 1, wherein said silicon germanium photoconductive layer has a thickness of from 5000 Å to 80 μm, and said second silicon carbide layer has a thickness of from 50 Å to 5000 Å.

4. The photosensitive member of claim 1, wherein said silicon germanium photoconductive layer has a thickness of from 1000 Å to 5 μm, and said second silicon carbide layer has a thickness of from 5000 Å to 80 μm.

5. The photosensitive member of claim 2, wherein said silicon germanium photoconductive layer has a thickness of from 5000 Å to 80 μm, and said second silicon carbide layer has a thickness of from 50 Å to 5000 Å.

6. The photosensitive member of claim 2, wherein said silicon germanium photoconductive layer has a thickness of from 1000 Å to 5 μm, and said second silicon carbide layer has a thickness of from 5000 Å to 80 μm.

7. The photosensitive member of claim 1, wherein the number of carbon atoms in said first silicon carbide layer is from 40 atomic % to 90 atomic %.

8. The photosensitive member of claim 1, wherein the number of carbon atoms in said second silicon carbide layer is from 10 atomic % to 90 atomic %.

9. The photosensitive member of claim 3, wherein the number of germanium atoms in said silicon germanium photoconductive layer is from 0.1 atomic % to 50 atomic %.

10. The photosensitive member of claim 3, wherein the number of carbon atoms in said silicon germanium photoconductive layer is from 0.001 ppm to 30 atomic %.

11. The photosensitive member of claim 3, wherein said silicon germanium photoconductive member is doped with an element of Group III A of the Periodic Table.

12. The photosensitive member of claim 11, wherein said element is selected from the group consisting of B, A1, Ga and In.

13. The photosensitive member of claim 4, wherein the number of germanium atoms in said silicon germanium photoconductive layer is from 0.1 atomic % to 50 atomic %.

14. The photosensitive member of claim 4, wherein the number of carbon atoms in said silicon germanium photoconductive layer is from 0.001 ppm to 30 atomic %.

15. The photosensitive member of claim 4, wherein said photoconductive member is doped with an element of Group III A of the Periodic Table.

16. The photosensitive member of claim 15, wherein said element is selected from the group consisting of B, A1, Ga and In.

17. The photosensitive member of claim 5, wherein the number of germanium atoms in said silicon germanium photoconductive layer is from 0.1 atomic % to 50 atomic %.

18. The photosensitive member of claim 5, wherein the number of carbon atoms in said silicon germanium photoconductive layer is from 0.001 ppm to 30 atomic %.

19. The photosensitive member of claim 5, wherein said silicon germanium photoconductive member is doped with an element of Group III A of the Periodic Table.

20. The photosensitive member of claim 6, wherein the number of germanium atoms in said silicon germanium photoconductive layer is from 0.1 atomic % to 50 atomic %.

21. The photosensitive member of claim 6, wherein the number of carbon atoms in said silicon germanium photoconductive layer is from 0.001 ppm to 30 atomic %.

22. The photosensitive member of claim 6, wherein said silicon germanium photoconductive member is doped with an element of Group III A of the Periodic Table.

23. The photosensitive member of claim 1, wherein said second silicon carbide layer is directly in contact with said substrate and said silicon germanium photoconductive layer.

24. The photosensitive element of claim 1, wherein the number of hydrogen atoms in each of said first silicon carbide layer and said second silicon carbide layer is from 1 to 40 atomic %.

25. The photosensitive element of claim 5, wherein the number of hydrogen atoms in each of said first silicon carbide layer and said second silicon carbide layer is from 1 to 40 atomic %.

26. The photosensitive element of claim 6, wherein the number of hydrogen atoms in each of said first silicon carbide layer and said second silicon carbide layer is from 1 to 40 atomic %.

27. The photosensitive element of claim 1, wherein the number of fluorine atoms in each of said first silicon carbide layer and said second silicon carbide layer is from 0.01 to 20 atomic %.

28. The photosensitive element of claim 5, wherein the number of fluorine atoms in each of said first silicon carbide layer and said second silicon carbide layer is from 0.01 to 20 atomic %.

29. The photosensitive element of claim 6, wherein the number of fluorine atoms in each of said first silicon carbide layer and said second silicon carbide layer is from 0.1 to 20 atomic %.

* * * * *